(12) United States Patent
Sivasubramanian (10) Patent No.: US 8,190,838 B1
(45) Date of Patent: *May 29, 2012

(54) SYSTEM AND METHOD FOR M-SYNCHRONOUS REPLICATION

(75) Inventor: Swaminathan Sivasubramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,077

(22) Filed: Jul. 11, 2011

Related U.S. Application Data (63) Continuation of application No. 11/961,133, filed on Dec. 20, 2007, now Pat. No. 7,979,652.

(51) Int. Cl.
*G06F 12/00* (2006.01)
(52) U.S. Cl. ......... 711/162; 711/141; 711/150; 711/165
(58) Field of Classification Search .................. None
See application file for complete search history.

(56) References Cited

U.S. PATENT DOCUMENTS

| | | | |
|---|---|---|---|
| 6,615,223 B1 | 9/2003 | Shih | |
| 6,996,672 B2 | 2/2006 | Lubbers et al. | |
| 7,058,731 B2 | 6/2006 | Kodama | |
| 7,117,327 B2 | 10/2006 | Hirakawa | |
| 7,143,122 B2 | 11/2006 | Burton | |
| 7,143,254 B2 | 11/2006 | Suishu | |
| 7,177,866 B2 | 2/2007 | Holenstein | |
| 7,203,687 B2 | 4/2007 | Adiba | |
| 7,219,103 B2 | 5/2007 | Vasudevan | |
| 7,287,043 B2 | 10/2007 | Lindsay et al. | |
| 2005/0050115 A1 | 3/2005 | Kekre | |
| 2005/0102547 A1 | 5/2005 | Keeton et al. | |
| 2005/0149578 A1 | 7/2005 | Sustman et al. | |
| 2005/0193024 A1 | 9/2005 | Beyer | |
| 2005/0193041 A1 | 9/2005 | Bourbonnais | |
| 2005/0223077 A1 | 10/2005 | Vellanki et al. | |
| 2007/0011213 A1 | 1/2007 | Burton | |
| 2007/0288537 A1 | 12/2007 | Bourbonnais | |

*Primary Examiner* — Reginald Bragdon
*Assistant Examiner* — Gurtej Bansal
(74) *Attorney, Agent, or Firm* — Robert C. Kowert; Meyertons, Hood, Kivlin, Kowert & Goetzel, P.C.

(57) ABSTRACT

A data replication system is implemented to replicate data among a plurality of replication nodes. Each node may be configured with durable storage (e.g., disk sub-system). The data replication system may receive write requests from one or more clients and send a replicate data write to the durable storage of each node. Once the data has been written to durable storage on a set of nodes, (regardless of whether the replicate data write has been completed to durable storage in each of the nodes not included in the set) the data replication system may send a write completion acknowledgement to the respective client for each write request. In some instances, the nodes within the set are configured to write data synchronously and the nodes not in the set are configured to write asynchronously. Performing both synchronous writes and asynchronous writes results in high performance and data durability.

17 Claims, 6 Drawing Sheets

SYSTEM AND METHOD FOR M-SYNCHRONOUS REPLICATION

This application is a Continuation of U.S. application Ser. No. 11/961,133, filed on Dec. 20, 2007, now U.S. Pat. No. 7,979,652, which is incorporated herein by reference in its entirety.

BACKGROUND OF THE INVENTION

When two or more computers are interconnected via data communications network, it becomes feasible to maintain several copies of data; each copy stored as a separate replica. Data replication is a common technique employed in distributed systems to improve the availability and durability of data. There are several reasons why data replication may be employed. For example, at least one copy of the data may be accessible in the case where some of the nodes are not available. Also, data replication helps improve the performance of read requests, because read requests may be distributed between many nodes.

In many data replication applications, replicated copies may be required to behave as a single copy to maintain mutual consistency (e.g., all copies of data converge to the same values and would be identical if all update activities cease). The inherent communication delay between nodes that store and maintain copies of replicated data make it difficult to ensure that all copies are identical at all times when updates are processed in the system.

One common technique used to ensure data durability is to perform synchronous writes. When processing a write request, a node may write the data contained in the write request to durable storage (e.g., disk sub-system) before acknowledging the write request was processed successfully. Even if the node subsequently fails, the data within the write request has been written to disk and can be recovered. However, synchronous writes result in slow performance because the write request is not acknowledged until the node has successfully written the data to durable storage.

One technique commonly used to maximize performance is to perform asynchronous writes. Typically, a node performing asynchronous writes may receive a write request and write the data to an in-memory buffer (e.g., main volatile memory). The node may then acknowledge the write request was successful and subsequently write the data to durable storage. The asynchronous write may ensure that the write request is not slowed by disk I/O performance. Accessing an in-memory buffer is significantly faster than accessing a disk. However, when using asynchronous writes, data may be lost, even after acknowledging the write request was processed successfully. For example, a node may fail after acknowledging the write request but before writing the data to durable storage.

SUMMARY

Various embodiments of a method and system for a data replication system are disclosed. The data replication system may comprise a plurality of replication nodes and each node may have, or be connected to durable storage. The data replication system may receive a write request from a client. In response to receiving a write request, the data replication system may perform a synchronous replicate data write of the data for the write request to each of a set of the plurality of data replication nodes. In addition, the data replication system may perform an asynchronous replicate data write of the data for the write request to each of the plurality of data replication nodes not in the set. The set includes fewer than all of the plurality of data replication nodes, such that some of the nodes are performing synchronous replicate data writes and some of the nodes are performing asynchronous replicate data writes.

For each write request, the data replication system may respond to the client by sending the client a write completion acknowledgement, once each synchronous replicate data write has been written to durable storage in each node within a set of data replication nodes. The response to the client may be sent regardless of whether the replicate data write has been completed in the durable storage in each of the nodes not in the set (e.g., the nodes performing asynchronous replicate data writes).

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

Figure 1:
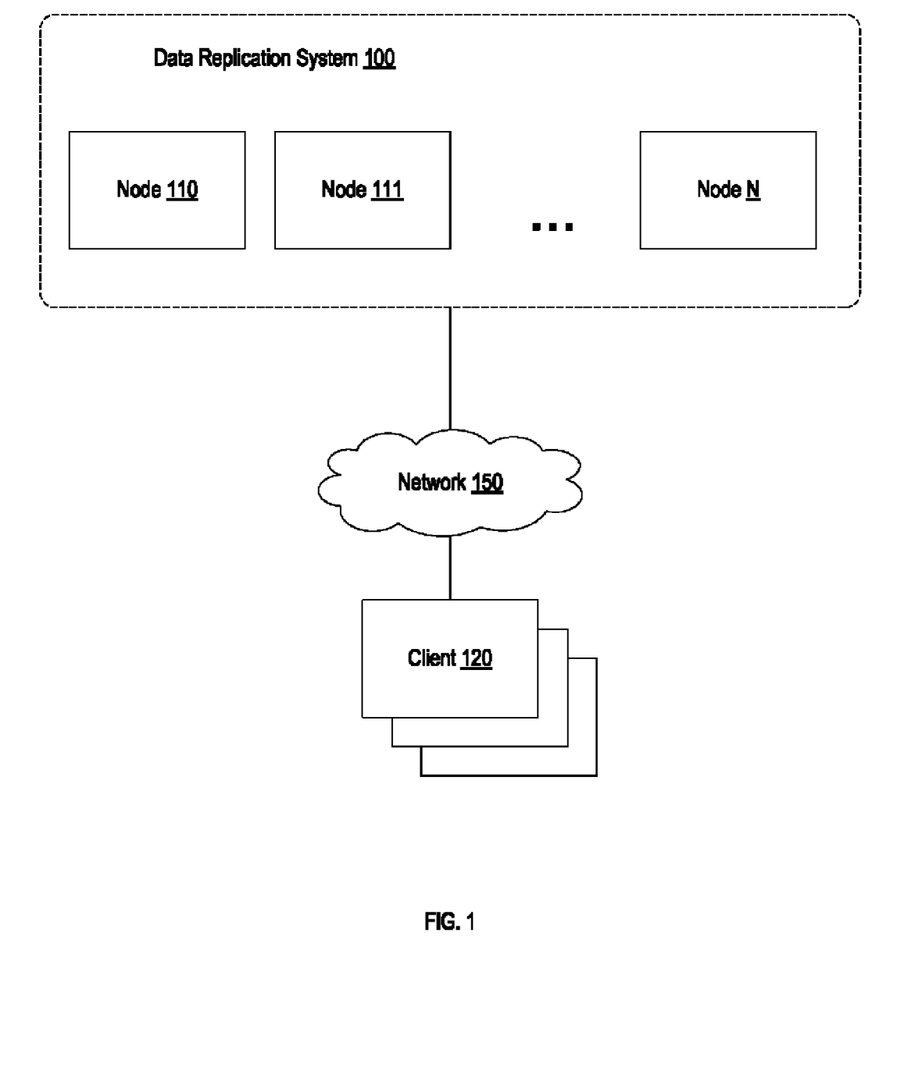
FIG. 1 is a block diagram illustrating a data replication system, according to an embodiment.

FIG. 1 is a block diagram illustrating a data replication system, according to an embodiment. A data replication system 100 may comprise one or more nodes, each having a replicated data set. Data replication system 100 may attempt to maintain mutually consistent copies of the replicated data set on each node.

The term "node", as used herein, may be defined as any computing device configured with, or connected to durable storage. In one embodiment, a node may be a server connected to durable storage and configured for network connectivity. Each node may be configured to store a copy of a data set. For example, the data set may be implemented as a database managed by a database management system. In another example, the data set may be implemented as one or more files managed by a file system. Each node may be configured to perform synchronous replicate data writes or asynchronous replicate data writes to durable storage. The term, "durable storage", as used herein, may be defined as any device capable of recording and storing information (e.g., data) such that the data will remain stored when power is removed from the device. An example of durable storage may be a disk sub-system.

Data replication system 100 may be configured to receive write requests from one or more clients 120 and distribute replicate data writes to the nodes included in data replication system 100. In some embodiments, data replication system 100 may perform synchronous replicate data writes on some nodes and asynchronous replicate data writes on other nodes. The ratio of nodes performing synchronous replicate data writes to the nodes performing asynchronous replicate data writes may be determined by a node within data replication system 100 (e.g., a primary node receiving a write request from a client). In other embodiments, a system administrator using a data replication administration application may define the ratio, and may store the ratio with other replication parameters in a file, registry or a database located on a primary node, on each node, or at another location accessible by data replication system 100. Data replication system 100 may read the parameters at run-time to determine which nodes should write synchronously and which nodes should write asynchronously.

Data replication system 100 may be implemented as a program or application that can run on a computing device, communicate via network 150 and write to durable storage. In some embodiments, data replication system 100 may be implemented as a background task (e.g., Windows Service, or Unix Daemon). In other embodiments, data replication system 100 may be implemented as a web service or another server side application or program. In some embodiments, data replication system 100 may be implemented as a component of another application, such as a database management system. Data replication system 100 may be implemented as a standalone program or process capable of executing within an operating system (such as Microsoft Windows™, Apple Macintosh™ OS, Linux/Unix, or another operating system environment) independent of other applications, programs, or processes. For example, data replication system 100 may be implemented in a programming language such as C or C++ and compiled into an executable code module, or implemented in a scripting language that may be interpreted at application runtime. Data replication system 100 may be implemented in, or use technologies such as Hypertext Markup Language (HTML), Java™, J2EE, Javascript, Perl, Common Gateway Interface (CGI), eXtensible Markup Language (XML), Simple Object Access Protocol (SOAP), web service technologies such as .NET™, etc., or another suitable technology for providing application functionality.

Data replication system 100 may be configured to receive network connection requests from client 120. Once the network connection is established, data replication system may receive write requests from client 120 and forward replicate data writes to nodes. Data replication system 100 may receive an acknowledgement from the nodes indicating the replicate data write succeeded or failed and after receiving acknowledgment from the nodes, data replication system 100 may respond to the client acknowledging success or failure. In other embodiments, data replication system 100 may receive write requests from clients through an intermediary system, such as a database management system, a web server or a web service. For example, client 120 may send write requests to a database management system, which may forward the request to data replication system 100.

In some embodiments, data replication system 100 may be implemented in a centralized replication control configuration, where a primary node may receive write requests from clients 120 and distribute replicate data writes to nodes of data replication system 100. (See the description for FIG. 5A for a description of centralized replication control.) In another embodiment, data replication system 100 may be implemented in a distributed replication control configuration, where any node may receive write requests and distribute replicate data writes to other nodes. (See the description for FIG. 5B for a description of distributed replication control.)

Client 120 may be any computing device configured to communicate with data replication system 100. In various embodiments, client 120 may be a desktop computer, laptop, server, personal digital assistant, or another computing device configured to read and write data via network 150. In some embodiments, client 120 may access data on one or more nodes 110 directly via network 150. In other embodiments, client 120 may access data replication system 100 by communicating with a primary node, which in turn may communicate with the other nodes of the data replication system 100. The replication of data between nodes may be transparent to the external clients 120 making read and write requests. A client may make a write request and receive a response (e.g., success or failure). Data replication system 100 may be configured to receive a write request from client 120. Data replication system 100 may forward a replicate data write to all nodes included in data replication system 100 and respond to client 120 acknowledging success or failure of the write request once the replicate data write has completed to durable storage on each of a set of one or more of the plurality of data replication nodes.

Network 150 provides a communication channel between clients 120 and data replication system 100. In addition, network 150 may provide a communications channel between nodes (not shown in FIG. 1). In some embodiments, a single node may be configured to communicate with each and every other node. In some embodiments, nodes may be located locally on the same local area network. In other embodiments, nodes may be located more remotely from each other, accessible via wide are network or the Internet. In various embodiments, nodes may be located in the same cluster configuration, distributed within the same room, distributed within the same building, distributed within the same city or distributed around the world. Network 150 may be configured to allow data to be exchanged between nodes, and between nodes and clients 120. Network 150 may correspond to various methods of communication between entities and may include, but is not limited to communication via the Internet, wide area network (WAN) and local area network (LAN). In some embodiments, communication between nodes and clients 120 may be implemented via messaging, file transfers, database updates or another suitable implementation. In general, network 150 may represent any method that one entity may utilize to communicate with another entity. While network 150 may be illustrated in a generalized manner, one of ordinary skill in the art will recognize that network 150 is meant to be representative of a complete communication path between entities with a specific type of communication channel. For example, network 150 may be a network communication channel including various intermediate destinations and/or communication networks (e.g., the Internet). A communications channel may include one or more telecommunications networks as well as various network devices including circuits, switches, routers, hubs, wireless access points and/or gateways. In various embodiments, network 150 may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol.

Nodes performing synchronous replicate data writes may not return an acknowledgement until the data has been written to durable storage for the respective node. Nodes performing asynchronous replicate data writes may return an acknowledgement after receiving the replicate data write request, which may be before the data is written to durable storage. Synchronous replicate data writes may perform slower than asynchronous replicate data writes. However, synchronous data writes may result in highly durable data, because the acknowledgment is not returned until after the data is written to durable storage. With this invention, some nodes within data replication system 100 may be configured for synchronous replicate data writes and other nodes may be configured for asynchronous replicate data writes. The ratio of nodes performing synchronous writes to the nodes performing asynchronous data writes may be adjusted or configured.

In some embodiments, data replication system 100 may receive a write request from a client 120 and in response, send a synchronous replica write of the data to one or more nodes, each having durable storage for storing data. In addition, the data replication system may send an asynchronous replica write of the data to one or more nodes having durable storage for storing data. The data replication system may be configured to receive an indication of completion from each of the nodes performing synchronous replica writes to durable storage. After receiving acknowledgement from each of the nodes performing synchronous writes, data replication system 100 may send an acknowledgement of completion to client 120. The acknowledgement of completion sent to client 120 may not depend on completion of the asynchronous replicate writes to durable storage.

In one example, a data replication system 100 may comprise four nodes, each configured with durable storage. In this example, the data replication system 100 may receive a write request from a client 120. The data replication system 100 may select nodes one and two to be within a set of nodes designated for synchronous writes and nodes three and four may be designated for asynchronous writes. The data replication system 100 may perform a replicate write, meaning the write request may be forwarded to each of the four nodes. The data replication system 100 may send a synchronous replicate data write to node-one and node-two (e.g., included in the set) and an asynchronous replicate data write to node-three and node-four, not included within the set. An acknowledgement may be sent to the client indicating the write request succeeded after each of the nodes within the set (e.g., node-one and node-two configured for synchronous writes) completes their respective writes to durable storage. The acknowledgement may then be sent to the client regardless of whether the write completed to durable storage on the nodes not included in the set (e.g., node-three and node-four).

Figure 2:
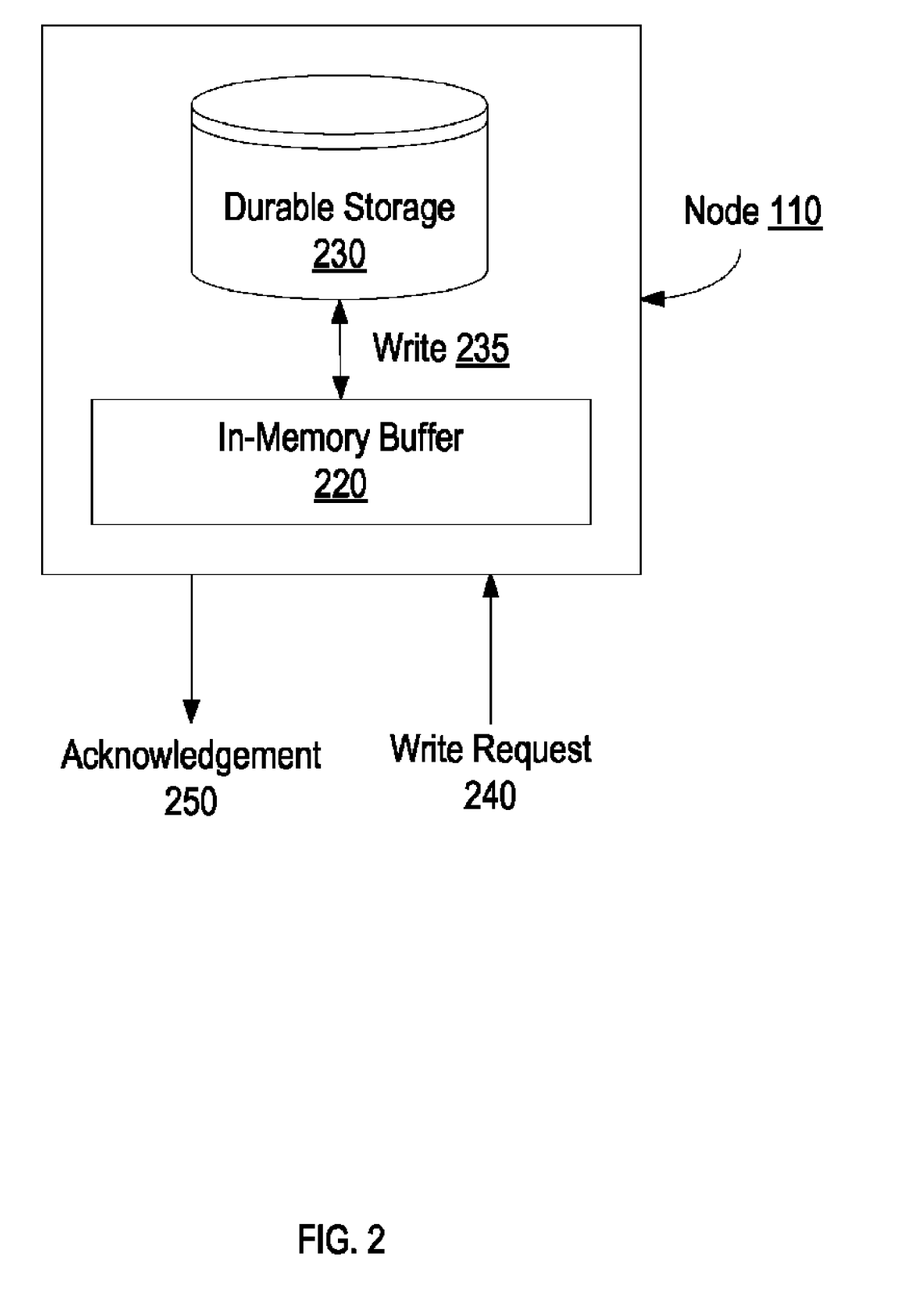
FIG. 2 is a block diagram illustrating a node, according to an embodiment.

FIG. 2 is a block diagram illustrating a node 110, according to an embodiment. Durable storage 230 may be any device (e.g., disk sub-system) capable of recording and storing information (e.g., data) such that the data will remain stored when power is removed from the device. In-memory buffer 220 may be any volatile memory (e.g., RAM). Node 110 may be configured to receive replicate data write 240 and respond with acknowledgement 250 indicating the write either succeeded or failed. Node 110 may be configured to perform synchronous writes or asynchronous writes.

When performing synchronous writes, node 110 may perform an atomic write operation, such that the write to the node's durable storage system 230 either completes or does not complete. When performing a synchronous replicate data write, node 110 may not send acknowledgement 250 until after the data has been written to durable storage 230. When processing a synchronous replicate data write, node 110 may utilize in-memory buffer 220 to temporarily store write request 240. However, acknowledgement 250 may not be returned until the data has been successfully written to durable storage 230.

Node 110 may be configured for asynchronous writes. The node performing an asynchronous replicate data write may receive a write request 240 and place data in in-memory buffer 220. The node 110 may send acknowledgment 250 indicating the write request was processed successfully. Subsequently, node 110 may perform a lazy write, such that the data may be written to durable storage 230. The fundamental difference between synchronous writes and asynchronous writes is that with synchronous writes, acknowledgement 250 is sent after the data is written to durable storage 230. With asynchronous writes, acknowledgement 250 is sent after the data is received (e.g., written to in-memory buffer 220). There may be a lag time between the point in time when the acknowledgement 350 is sent and the point in time when the node writes the data to durable storage 230. Performance may be faster with asynchronous writes because writing data to the in-memory buffer 220 may be faster than writing to durable storage 230.

When servicing a read request from a client, the node performing asynchronous writes may check the in-memory buffer for the data being requested by the client before searching durable storage. This ensures that the client receives the most current data.

Figure 3:
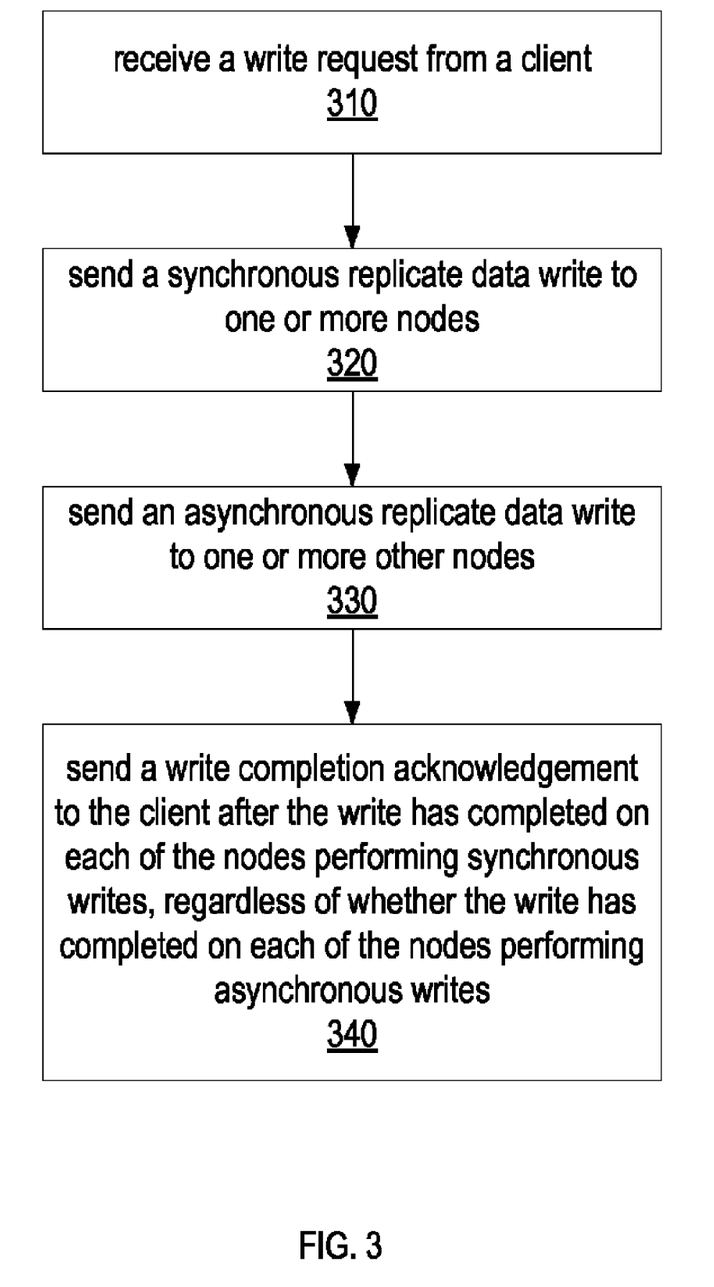
FIG. 3 is a flow diagram illustrating data replication system performing writes, according to an embodiment.

FIG. 3 is a flow diagram illustrating a data replication system, according to an embodiment. As shown in block 310, data replication system 100 may receive a write request from client 120. For example, the data set located on each node 110 may be a database and a client 120 may send a write request comprising a database update. In some instances, data replication system 100 may receive the write request directly from client 120. In other instances, data replication system 100 may be a component of an application (e.g., database management system) and data replication system 100 may receive the write request indirectly (e.g., through the database management system). In another instance, data replication system 100 may be implemented as a stand-alone application or service and data replication system 100 may receive the write request indirectly through another application (e.g., web server or web service).

After receiving the write request, data replication system may determine which nodes are to receive synchronous replicate data writes and which nodes are to receive asynchronous replicate data writes. (See the description of FIG. 5A for more information regarding how data replication system 100 may determine the ratio of synchronous writes to asynchronous writes.) A synchronous replicate data write may be sent to one or more nodes within data replication system 100, as shown in block 320. An asynchronous replicate data write may be sent to one or more other nodes, as shown in block 330.

Each node within data replication system 100 may write the data to durable storage. The nodes may return an acknowledgment internally to data replication system 100 indicating success or failure. The nodes performing synchronous writes may return an acknowledgement after having successfully written the data to durable storage. Data replication system 100 may send a write completion acknowledgement to the client 120 after the write has completed to durable storage on each of the nodes performing synchronous writes, (See block 340) regardless of whether the write has completed on each of the nodes performing asynchronous writes.

Figure 4:
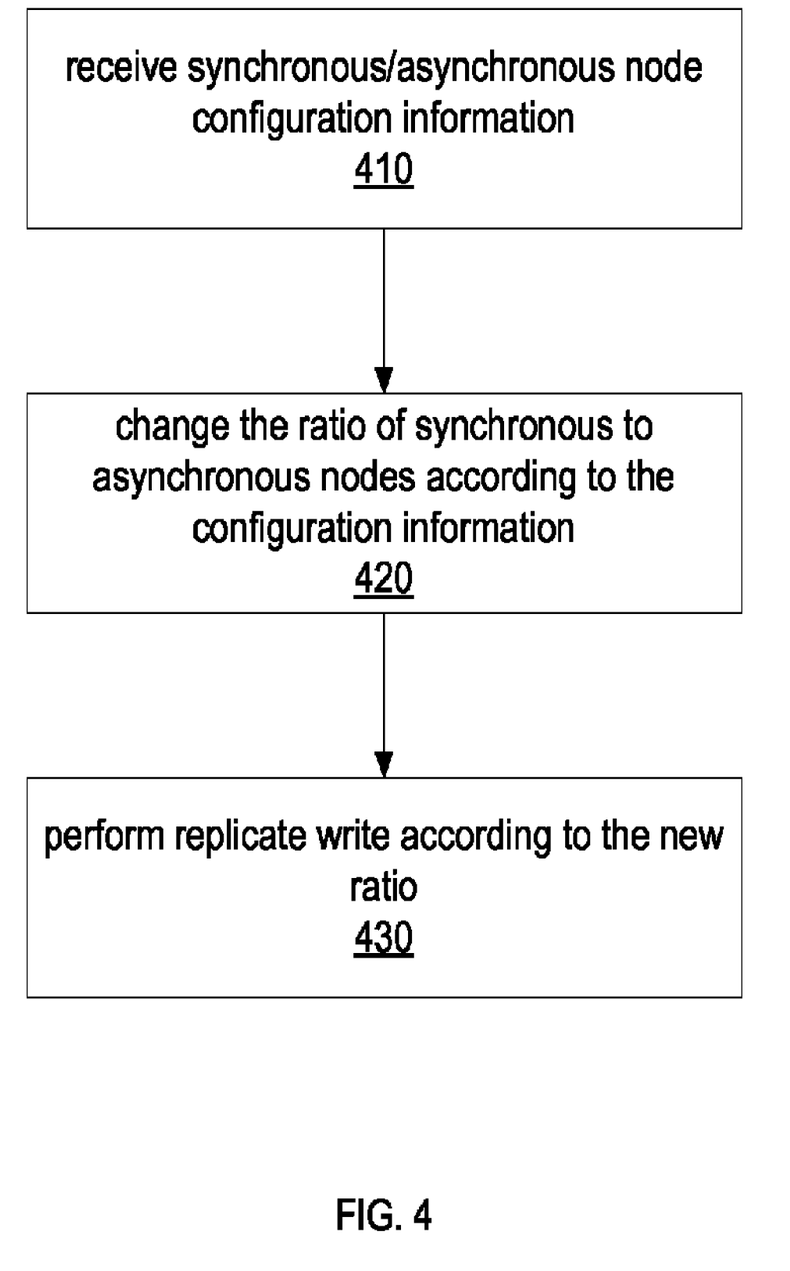
FIG. 4 is a flow diagram illustrating the configuration of a data replication system, according to an embodiment.

FIG. 4 is a block diagram illustrating data replication system 100 receiving node configuration information, according to an embodiment. As shown in block 410, data replication system 100 may receive synchronous and asynchronous node configuration information. In some embodiments, node configuration information may be in the form of a ratio of nodes performing synchronous replicate data writes to nodes performing asynchronous replicate data writes. For example, if a data replication system 100 has four nodes, one node may be configured for synchronous replicate data writes and three nodes may be configured for asynchronous replicate data writes. In this example, the ratio may be 1:3.

As shown in block 420, data replication system may change the ratio of synchronous nodes to asynchronous nodes, according to the configuration information. Each node may perform the replicate data write according to the new ratio, as shown in block 430.

In various embodiments, node configuration information may be received in a variety of ways. In one example, an administrator may designate the ratio of nodes performing synchronous replicate data writes to nodes performing asynchronous replicate data writes by using a replication administration application. The administration application may define parameters (e.g., synchronous to asynchronous ratio) in a configuration data store located on a primary node within data replication system 100. When the primary node receives a write request from a client, the primary node may read the configuration data store to determine which nodes should perform synchronous writes and which nodes should perform asynchronous writes. The primary node may forward a synchronous replicate data write to each node designated for synchronous writes and an asynchronous replicate data write to each node designated for asynchronous writes.

In a variation on the embodiment described above, the administration program may configure each node, designating whether the node should perform synchronous writes or asynchronous writes. The primary node may forward a replicate data write to each node (e.g., without an indication as to whether the node should write synchronously or asynchronously) and the respective nodes may read their configuration, and perform the write based on the node's respective configuration.

In another embodiment, the primary node receiving the write request may determine the ratio of synchronous writes to asynchronous writes. The ratio may change with every write request or the ratio may change depending on a performance metric or depending on a threshold defined in a policy. (See the description for FIG. 5A for more information on configuration changes due to load or policy). The performance metric may be determined by comparing the time a write request is received from a client to the time an acknowledgement indicating the write request was processed is returned to the client. The performance metric may be aggregated over a time period.

Similar to the performance metric discussed above, the ratio of synchronous writes to asynchronous writes may be adjusted according to a durability metric. The durability metric may correspond to some measure of system durability or reliability. For example, the durability metric may be determined by monitoring the mean time between failures of nodes in the data replication system. In other cases, the durability metric may be determined according to an average "up-time" for the system. In other cases, the durability metric may be determined by measuring the mean time between failed or dropped write requests or a rate of change in the number of dropped write requests or other transmission to or between nodes. The durability metric may be compared to one or more thresholds defined in a policy and the data replication system may adjust the ratio of synchronous writes to asynchronous writes up or down when the durability metric reaches one or more thresholds.

In another embodiment, client 120 may determine the ratio of synchronous writes to asynchronous writes and may send the write request along with configuration information (e.g., ratio of synchronous writes to asynchronous writes) to replication system 100.

Figure 5A:
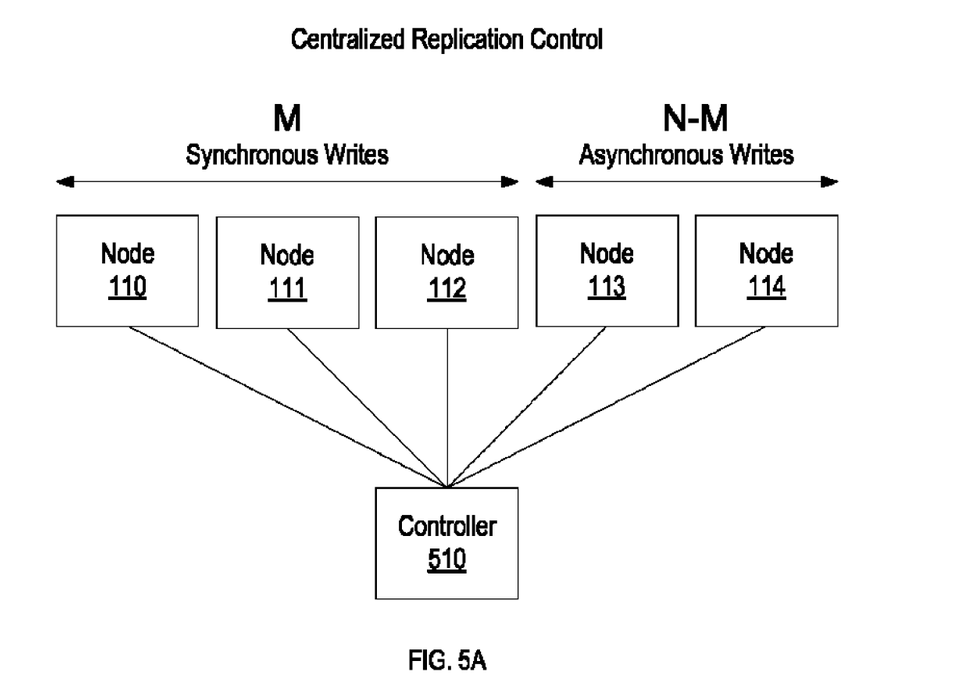
FIG. 5A is a block diagram illustrating centralized replication control, according to an embodiment.

FIG. 5A is a block diagram illustrating a data replication system 100 configured for centralized replication control, according to an embodiment. With centralized replication control, all write requests may pass through a central control point (e.g., controller 510). Controller 510 may distribute the replicate data write to all nodes (e.g., 110A-110E) that maintain replicated data. In some embodiments, controller 510 may be a primary node within replication system 100. In other embodiments, controller 510 may not be a node included in data replication system 100, but may instead be a computer system connected to data replication system 100 and all write requests may pass through the computer system to nodes 110. In a centralized replication control configuration, a set of nodes may write data synchronously and the remaining nodes (e.g., not in the set) may write data asynchronously.

In various embodiments, controller 510 may determine the ratio of nodes performing synchronous writes to nodes performing asynchronous writes. Controller 510 may determine the ratio dependent on performance levels and/or latency requirements. For example, if the data replication system's response time is fast, indicating a light load, controller 510 may increase the number of synchronous writes and decrease the number of asynchronous writes. As described above, synchronous writes may perform slower than asynchronous writes, but synchronous writes may provide more durability. Conversely, if the response time of data replication system 100 is slow, indicating a heavy load, controller 510 may reduce the number of nodes performing synchronous writes and increase the number of nodes performing asynchronous writes. Adjusting the ratio of nodes performing synchronous writes to nodes performing asynchronous writes means tuning the system across a spectrum of choices, such that the emphasis between durability and performance changes as the ratio changes. There is an inherent emphasis tradeoff between durability and performance. Adjusting the ratio to include more nodes performing synchronous writes emphasizes durability. Adjusting the ratio to include more nodes performing asynchronous writes emphasizes performance.

In some embodiments, a load-monitoring component may be implemented on controller 510. The load-monitoring component may monitor the response times of nodes processing replicate write requests. The load-monitoring component may compare a timestamp of the time a replicate data write is sent to a node to the timestamp of the acknowledgement that the replicate data write completed. The load-monitoring component may determine trends by monitoring the differences in timestamps over a period of time. Controller 510 may use the data collected by the load-monitoring component to determine the ratio of synchronous writes to asynchronous writes.

In some embodiments, controller 510 may utilize a policy to determine when to change the ratio of synchronous writes to asynchronous writes. For example, a policy may designate one or more performance thresholds that when reached, cause controller 510 to change the ratio. Controller 510 may utilize the load-monitoring component described above to determine when thresholds have been reached. The policy may be defined by a data replication system administration application.

In addition to determining the ratio of synchronous writes to asynchronous writes, controller 510 may select which nodes will write synchronously. Controller 510 may select nodes using any suitable method. For example, controller 510 may perform a hash on an object within the write request and select nodes based on the resulting hash value. In another example, the first X nodes may be selected from an alphabetized or numeric list of nodes. In another example, nodes may be selected using a random selection process. Those skilled in the art will recognize many suitable methods for selecting nodes.

In one example of how a centralized replication control configuration may operate, a data replication system 100 may be configured with a relational database system. The database may be located on controller 510, which may be a primary node within the data replication system 100. Copies of the database may be located on nodes 110A-110E. In this example, controller 510 may receive a database update from client 120. Controller 510 may use a round robin selection method and select nodes 110A-110C for synchronous replicate data writes and nodes 110D-110E for asynchronous replicate data writes. In this example, controller 510 may forward the database update as a synchronous replicate write to each node 110A-110C and an asynchronous replicate data write to nodes 110D-110E. Each node may receive the update and perform the write operation. Nodes 110A-110C may respond to controller 510 after writing the update to durable storage synchronously on their respective databases. Nodes 110D-110E may respond to controller 510 after receiving the update. Once controller 510 receives response from nodes 110A-110C indicating a successful write, an acknowledgement indicating the update was successful may be sent to client 120. Nodes 110D-110E may subsequently write the update to durable storage.

Load balancing is a technique to spread work between two or more nodes. Some load balancing techniques may use a configuration similar to the configuration illustrated in FIG. 5A, such that a master controller may spread work between two or more nodes. With load balancing, a large task may be broken down into two or more units of work and each unit may be distributed to a separate node. This differs from data replication, in that data replication sends a replicate data write to all nodes. However, load balancing may co-exist with data replication with regard to balancing read requests from clients 120. Controller 510 may use a variety of different algorithms to determine which node to send a read request to. Examples include random choice and round robin. More sophisticated load balancers may take into account additional factors, such as a node's reported load and recent response times. In some embodiments without load balancing, clients may access any node directly to make read requests.

In various embodiments, an administrator may use a data replication administration application to configure data replication system 110 regarding which nodes are selected for synchronous writes and which nodes are selected for asynchronous writes. The administration application may be a network-based application (e.g., web-based) or run locally on each node.

In one example, the administration application may define configuration data on controller 510. The configuration data may designate the ratio of synchronous writes to asynchronous writes. Controller 510 may send an indication (e.g., synchronous replicate data write or asynchronous replicate data write) to each node. The indication may depend on the configuration data defined by the administration application.

In another example, the administration application may configure each node independently to either write synchronously or asynchronously. In this example, each node will write data according to the configuration located on the respective node.

Figure 5B:
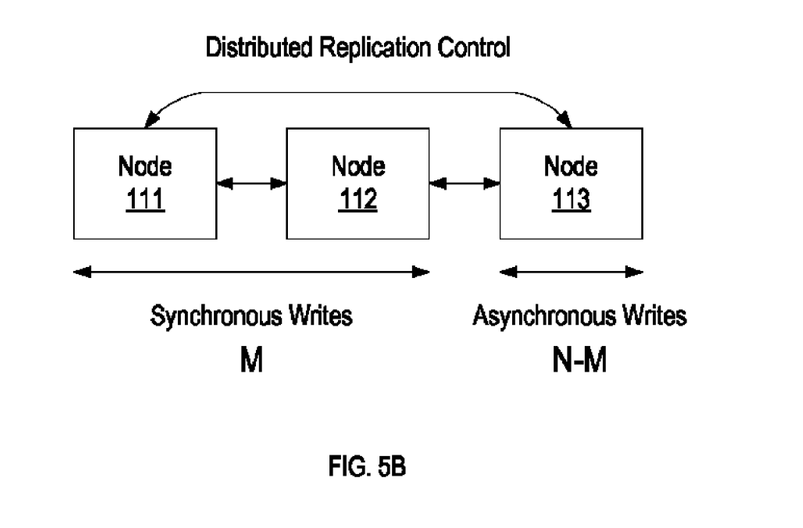
FIG. 5B is a block diagram illustrating distributed replication control, according to an embodiment.

FIG. 5B is a block diagram illustrating distributed replication control, sometimes called multi-primary or multi-master control. In a distributed replication control configuration, no one node 110 controls the distribution of updates. Any node 110 may receive a write request from a client 120. Replicate data writes are distributed among the nodes 110 and success is determined using a form of distributed concurrency control, such as a quorum consensus approach. A transaction involving write operations may not be committed unless a majority of nodes 110 consent, while read operations can be processed locally by any node 110. Using the quorum approach, the update procedure (e.g., processing the write request) is decomposed into several steps for determining the new values to be written, and then applying the update after successfully collecting a majority of votes from nodes 110 during the synchronization step. In some embodiments, the update procedure may also determine which nodes should apply the update synchronously and which nodes should apply the update asynchronously. An indication (e.g., synchronous or asynchronous) may be sent with the replicate data write to each node. As describe above in the description of FIG. 5A, many techniques may be used to determine which nodes will write synchronously and which nodes will write asynchronously.

In a distributed replication control configuration as shown in FIG. 5B, each node may be individually configured for synchronous writes or asynchronous writes. An administrator may configure each node using a replication administration program. For example, as shown in FIG. 5B, nodes 110A and 110B may be configured for synchronous writes and node 110C may be configured for asynchronous writes. In one example, when a quorum consensus is reached and the update is sent to each node, the node may apply the update according to how the node is configured (e.g., synchronously or asynchronously).

Figure 6:
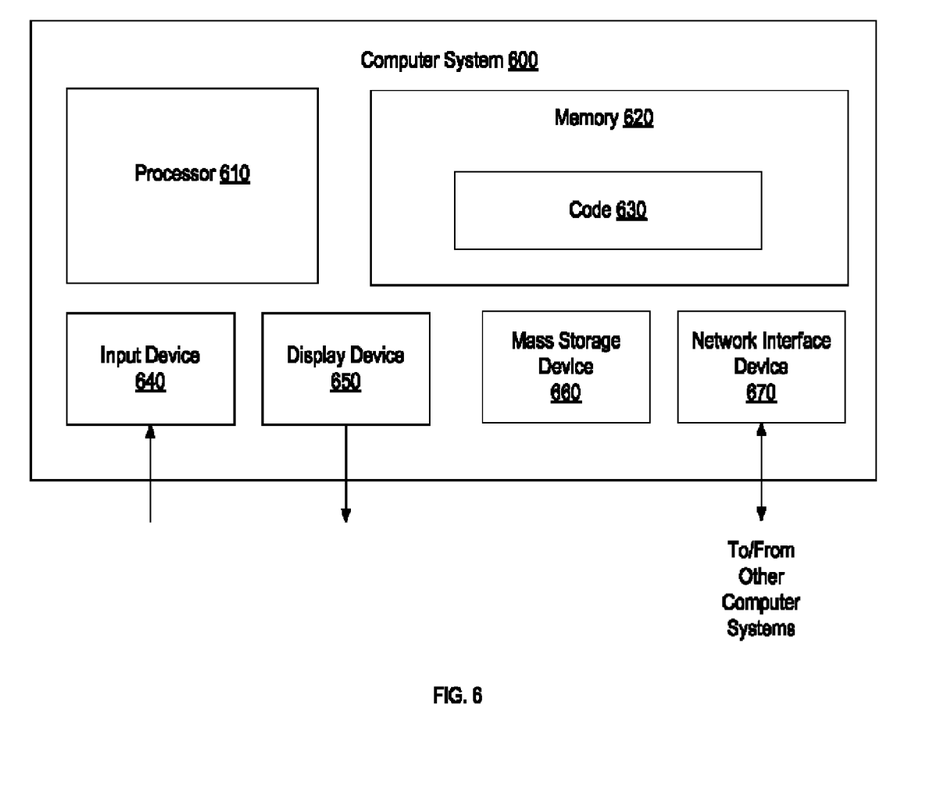
FIG. 6 is a block diagram illustrating a system for implementing a data replication system, according to an embodiment.

FIG. 6 is a block diagram illustrating a computing device, according to an embodiment. Various components of embodiments of the data replication system, clients and nodes, etc., as described herein, may be executed on one or more computer systems, which may interact with various other devices. One such computer system is illustrated by FIG. 6. In the illustrated embodiment, computer system 600 includes one or more processors 610 coupled to a system memory 620. Computer system 600 further includes a network interface 670 and one or more input/output devices 640/650, such as a cursor control device, keyboard, audio device and display device 650. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, Scalable Processor Architecture (SPARC), or Million Instructions per Second (MIPS) Instruction Set Architectures (ISAs), or any other suitable ISA. In multiprocessor systems, each of processors 610 may commonly, but not necessarily, implement the same ISA.

System memory 620 may be configured to store program instructions 630 and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for the data replication system, are shown stored within system memory 620 as program instructions 630 and data storage 660, respectively. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or Digital Versatile Disc (DVD) Read Only Memory (ROM)/Compact Disk-Read Only Memory (CD-ROM) coupled to computer system 600. Program instructions and data stored via a computer-accessible medium may be transmitted by transmission media or signals such as electrical, electromagnetic, or digital signals, which may be provided via a communication medium such as a network and/or a wireless link, such as may be implemented via network interface 670.

Network interface 670 may be configured to allow data to be exchanged between computer system 600 and other devices attached to a network, such as other computer systems, or between nodes of computer system 600. In various embodiments, network interface 670 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 640 and 650 respectively, may in some embodiments include one or more display terminals, keyboards, keypads, touchpads, scanning devices, voice or optical recognition devices, or any other devices suitable for entering or retrieving data by one or more computer system 600. Multiple input/output devices 640 and 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 670.

Memory 620 may include program instructions 630, configured to implement at least a portion of embodiments of the data replication system as described herein, and data storage 660, comprising various documents, tables, databases, etc. accessible by program instructions 630. In one embodiment, program instructions 630 may include software elements of the data replication system illustrated in the Figures, and data storage 660 may include data used in embodiments of the data replication system. In other embodiments, different software elements and data may be included. Program instructions and/or data may be stored, for example, on various types of memory including hard disks.

Those skilled in the art will appreciate that computer system 600 is merely illustrative and is not intended to limit the scope of the data replication system as described herein. In particular, the computer system and devices may include any combination of hardware or software that can perform the indicated functions, including computers, network devices, internet appliances, PDAs, mobile phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, provided via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM), etc. as well as transmission media or signals such as electrical, electromagnetic, or digital signals, provided via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a data replication system comprising a plurality of data replication nodes;
each data replication node comprising a durable storage,
wherein, in response to receiving a write request from a client, the data replication system is configured to perform a synchronous replicate data write of the data for the write request to each of a set of the plurality of data replication nodes and to perform an asynchronous replicate data write of the data for the write request to each of the plurality of data replication nodes not in the set,
wherein the data replication system is configured to change a number of nodes in the set of the plurality of data replication nodes and a number of the data replication nodes not in the set between a configuration and another configuration,
wherein the set includes, in both the configuration and the another configuration, at least one of the plurality of data replication nodes but fewer than all the plurality of data replication nodes, and
wherein the nodes not in the set include, in both the configuration and the other configuration, at least one of the plurality of data replication nodes but fewer than all the plurality of data replication nodes;
wherein the data replication system is configured to send a write completion acknowledgement to the client once each synchronous replicate data write has been completed in the durable storage in each respective node of the set regardless of whether each asynchronous replicate data write has yet been completed in the durable storage in each respective node not in the set.

2. The system as recited in claim 1, wherein the data replication system is configured to send the write completion acknowledgement in response to each node of the set indicating completion of the synchronous replicate data write in its durable storage and in response to each node not in the set indicating receipt of the asynchronous replicate data write.

3. The system as recited in claim 1, wherein each data replication node further comprises an in-memory buffer configured to buffer replicate data writes prior to completion of the replicate data writes in the corresponding durable storage.

4. The system as recited in claim 3, wherein each data replication node is configured to indicate a synchronous replicate data write complete once the replicate data write is complete to the node's durable storage, and wherein each data replication node is configured to indicate an asynchronous replicate data write complete once the replicate data write has been received at the node's in-memory buffer.

5. The system as recited in claim 1, wherein each write request from a client is received by a primary node for the data replication system, wherein the primary node is configured to determine for each write request which of the nodes belong to said set.

6. The system as recited in claim 5, wherein the primary node is configured to initiate the synchronous and asynchronous replicate data writes of the data for each write request to the respective ones of the plurality of data replication nodes.

7. The system as recited in claim 6, wherein the primary node is one of the plurality of data replication nodes.

8. A computer-implemented method, comprising:
in response to a write request from a client:
sending synchronous replicate writes of the data for the write request to one or more nodes each having durable storage for storing the data,
sending asynchronous replicate writes of the data for the write request to one or more other nodes each having durable storage for storing the data,
receiving an indication of completion of each synchronous replicate write to the durable storage of the respective node, and
acknowledging completion of the write request to the client after receiving the indication of completion for each synchronous replicate write, wherein acknowledging completion of the write request to the client is not dependent on completion of the asynchronous replicate writes to durable storage; and
changing a number of nodes configured for synchronous replicate writes and a number of nodes configured for asynchronous replicate writes,
wherein both before and after the changing, the number of nodes configured for synchronous replicate writes includes at least one of the one or more nodes, and
wherein both before and after the changing, the number of nodes configured for asynchronous replicate writes includes at least one of the other nodes but fewer than all the other nodes.

9. The method as recited in claim 8, further comprising:
receiving a write request from a client;
selecting the nodes for synchronous replicate writes; and
selecting the nodes for asynchronous writes.

10. The method of claim 8, further comprising, initiating the replicate data write of the data for each write request to each of the plurality of data replication nodes.

11. The method of claim 8, further comprising:
designating a ratio of a number of nodes configured for synchronous replicate writes to a number of nodes configured for asynchronous replicate writes;
selecting the number of nodes to send synchronous writes to, according to said ratio; and
selecting the number of nodes to send asynchronous writes to, according to said ratio.

12. The method of claim 11, wherein said ratio is determined according to configuration data.

13. A computer-accessible storage medium, comprising program instructions, wherein the program instructions are computer-executable to:
receive a write request from a client;
send synchronous replicate writes of the data for the write request to one or more nodes of a data replication system, each having durable storage for storing data;
send asynchronous replicate writes of the data for the write request to one or more other nodes of the data replication system, each having durable storage for storing the data;
receive an indication of the completion of each synchronous replicate write to the durable storage of the respective node;
acknowledge completion of the write request to the client after receiving the indication of the completion for each synchronous replicate write, wherein acknowledging the completion of the write request to the client is not dependent on completion of the asynchronous replicate writes to durable storage; and
change a number of nodes configured for synchronous replicate writes and a number of nodes configured for asynchronous replicate writes,
wherein both before and after the changing, the number of nodes configured for synchronous replicate writes includes at least one of the one or more nodes, and wherein both before and after the changing, the number of nodes configured for asynchronous replicate writes includes at least one of the other nodes.

14. The computer-accessible storage medium of claim 13, wherein the program instructions are further executable to:
receive a write request from a client;
select the nodes for synchronous replicate writes; and
select the nodes for asynchronous writes.

15. The computer-accessible storage medium of claim 13, wherein the program instructions are further executable to:
designate a ratio of a number nodes configured for synchronous replicate writes to a number of nodes configured for asynchronous replicate writes;
select the number of nodes to send synchronous writes to, according to said ratio; and
select the number of nodes to send asynchronous writes to, according to said ratio.

16. The computer-accessible storage medium of claim 15, wherein said ratio is determined according to a policy comprising one or more thresholds; and said program instructions are further executable to:
obtain a performance metric, wherein said performance metric is determined according to the response time of said data replication system, wherein said response time comprises the difference between the time the data replication system receives a client request and the time the data replication system acknowledges completion of the write request;
compare said performance metric to said one or more thresholds; and
change said ratio when one of said one or more thresholds is reached by said performance metric.

17. The computer-accessible storage medium of claim 15, wherein said ratio is determined according to a policy comprising one or more thresholds; and said program instructions are further executable to:
obtain a durability metric;
compare said durability metric to the one or more thresholds; and
change said ratio when one of the one or more thresholds is reached by said durability metric.

* * * * *